United States Patent Office 3,072,663
Patented Jan. 8, 1963

3,072,663
POLYALKYL SUBSTITUTED-4-GUANIDO-PIPERIDINES
Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,217
2 Claims. (Cl. 260—293)

The present invention relates to new and novel piperidine derivatives having the formula

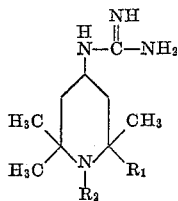

wherein $R_1$ is hydrogen or methyl and $R_2$ is hydrogen or lower alkyl, and to the non-toxic pharmaceutically acceptable acid addition and quaternary ammonium salts thereof.

The compounds of our invention having the above formula have been found to possess significant pharmacological activity in lowering blood pressure. Moreover, they are valuable intermediates in the production of other piperidine derivatives.

We have now found that the compounds of our invention having the above formula may be prepared by the guanylation of the known 4-aminopiperidine derivatives of the formula

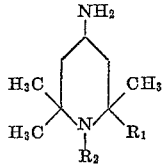

We have found that 1-guanyl-3,5-dimethylpyrazole is an effective guanylation agent. The reactants are fused at 100 to 120° C. and the desired product is recovered by crystallization.

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The folloẇding example is included in order further to illustrate our invention:

EXAMPLE

*4-Guanido-1,2,2,6,6-Pentamethylpiperidine*

1-guanyl-3,5-dimethylpyrazole nitrate (9.3 g., 0.046 mole) and 4-amino-1,2,2,6,6-pentamethyl-piperidine (3.9 g., 0.023 mole) are fused together at a bath temperature of 110° for three hours. Treatment of the cooled melt with 25 ml. of boiling 2-propanol gives 3.95 g. of white crystals M.P. 211–213°. Recrystallization of this material from 75 ml. of acetonitrile yields 2.49 g. (32%) of the dinitrate salt of 4-guanido-1,2,2,6,6-pentamethylpiperidine, M.P. 212–215° dec. In a capillary evacuated to about 0.1 mm. and sealed, the M.P. is 227–229° without apparent decomposition.

The analytical sample is prepared by recrystallizing twice from ethanol. In a sealed evacuated capillary it melts at 225–226°.

*Analysis.*—Calc.: C, 39.16; H, 7.47; N, 24.91. Found: C, 39.37; H, 7.77; N, 24.85.

In the foregoing example, all temperatures are given in degrees centigrade.

It is understood that the foregoing detailed description is given merely by way of illustration and that many variations may be made therein without departing from the spirit of our invention.

Having described our invention what we desire to secure by Letters Patent is:

1. A member selected from the group consisting of compounds of the formula

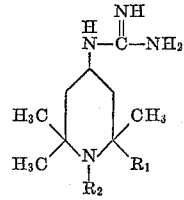

wherein $R_1$ is a member selected from the group consisting of hydrogen and methyl and $R_2$ is a member selected from the group consisting of hydrogen and lower alkyl, and the non-toxic pharmaceutically acceptable acid addition salts thereof.

2. 4-guanido-1,2,2,6,6-pentamethylpiperidine.

No references cited.